(12) United States Patent
Mangalore et al.

(10) Patent No.: US 9,418,209 B2
(45) Date of Patent: Aug. 16, 2016

(54) SYSTEMS AND METHODS FOR MANIPULATING SENSITIVE INFORMATION IN A SECURE MOBILE ENVIRONMENT

(71) Applicant: MOTOROLA MOBILITY LLC, Libertyville, IL (US)

(72) Inventors: Geetha Mangalore, San Diego, CA (US); Lorne J. Lameer, Burlington, WI (US); Paul Moroney, La Jolla, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 53 days.

(21) Appl. No.: 14/043,233

(22) Filed: Oct. 1, 2013

(65) Prior Publication Data

US 2014/0095890 A1   Apr. 3, 2014

Related U.S. Application Data

(60) Provisional application No. 61/709,149, filed on Oct. 2, 2012.

(51) Int. Cl.
*G06F 21/10* (2013.01)
*G06F 21/60* (2013.01)

(52) U.S. Cl.
CPC ............... *G06F 21/10* (2013.01); *G06F 21/60* (2013.01); *G06F 2221/0797* (2013.01); *G06F 2221/2105* (2013.01); *H04L 2209/603* (2013.01); *H04L 2463/101* (2013.01)

(58) Field of Classification Search
CPC ..... G06F 21/10; G06F 21/6218; G06F 21/60; H04L 2463/101; H04L 2209/603
USPC ............................................ 713/189; 726/27
See application file for complete search history.

(56) References Cited

U.S. PATENT DOCUMENTS

| | | | |
|---|---|---|---|
| 2004/0030907 A1* | 2/2004 | Dariel ........................... | 713/189 |
| 2006/0137017 A1* | 6/2006 | Evans et al. ..................... | 726/26 |
| 2006/0271998 A1* | 11/2006 | Kadambi et al. ............... | 725/135 |
| 2009/0006868 A1* | 1/2009 | Alkove et al. .................. | 713/193 |
| 2014/0075582 A1* | 3/2014 | Hierro et al. .................... | 726/30 |

* cited by examiner

*Primary Examiner* — Saleh Najjar
*Assistant Examiner* — Peiliang Pan
(74) *Attorney, Agent, or Firm* — Morris & Kamlay LLP

(57) ABSTRACT

Methods and devices for protecting and manipulating sensitive information in a secure mobile environment are disclosed. Methods and devices for processing secure transactions and secure media processing up to rendering in human readable form using abstract partitioning between non-secure and secure environments are disclosed.

31 Claims, 9 Drawing Sheets

SYSTEMS AND METHODS FOR MANIPULATING SENSITIVE INFORMATION IN A SECURE MOBILE ENVIRONMENT

CROSS-REFERENCE TO RELATED APPLICATIONS

The present application claims the benefit of U.S. provisional patent application No. 61/709,149, entitled "A method of Architecture definition of secure playback of HD content using Trusted Execution Environment (TEE) for OTT (Over the Top) and Home Network" filed Oct. 2, 2012, incorporated herein by reference in its entirety.

FIELD

The disclosure relates generally to the field of digital rights management (DRM), and more particularly to the field of protecting and manipulating sensitive information in a secure environment with emphasis to playback of protected high definition) (HD) content having additional restrictions.

BACKGROUND

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof. The stored content can also be streamed to the client. In addition, the client can stream from a live source such as a tuner-based server e.g., broadcast service.

The content player is configured to download or stream and play a digital content file, in response to a user request selecting the title for playback. The process of playing the digital content includes decoding and rendering audio and video data into an audio signal and a video signal, which may drive a display system having a speaker subsystem and a video subsystem. In the case of streaming, the content data is transmitted from an already-created content file sequentially to the content player. Streaming can also be live when the source is, for example, from a tuner using HTTP Live Streaming protocol (HLS). In this embodiment, HLS is used for streaming. The downloaded file can be either in HLS or MP4 ISO14496-12 formats. The player is configured to play the digital content as described above.

Content data is typically encrypted and needs to be decrypted before the data can be played. The playback process, therefore, includes four steps, (i) retrieve content, (ii) decrypt content, (iii) decode content and (iv) output content. For the purposes of content protection, the content is most vulnerable at step (ii). At this step, the decrypted (and, therefore, unprotected) but still compressed content data is available. Since it is not always desirable or possible to prevent execution of un-trusted code, the decrypted content at step (ii) is vulnerable to attacks from third-party applications.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

Figure 1:
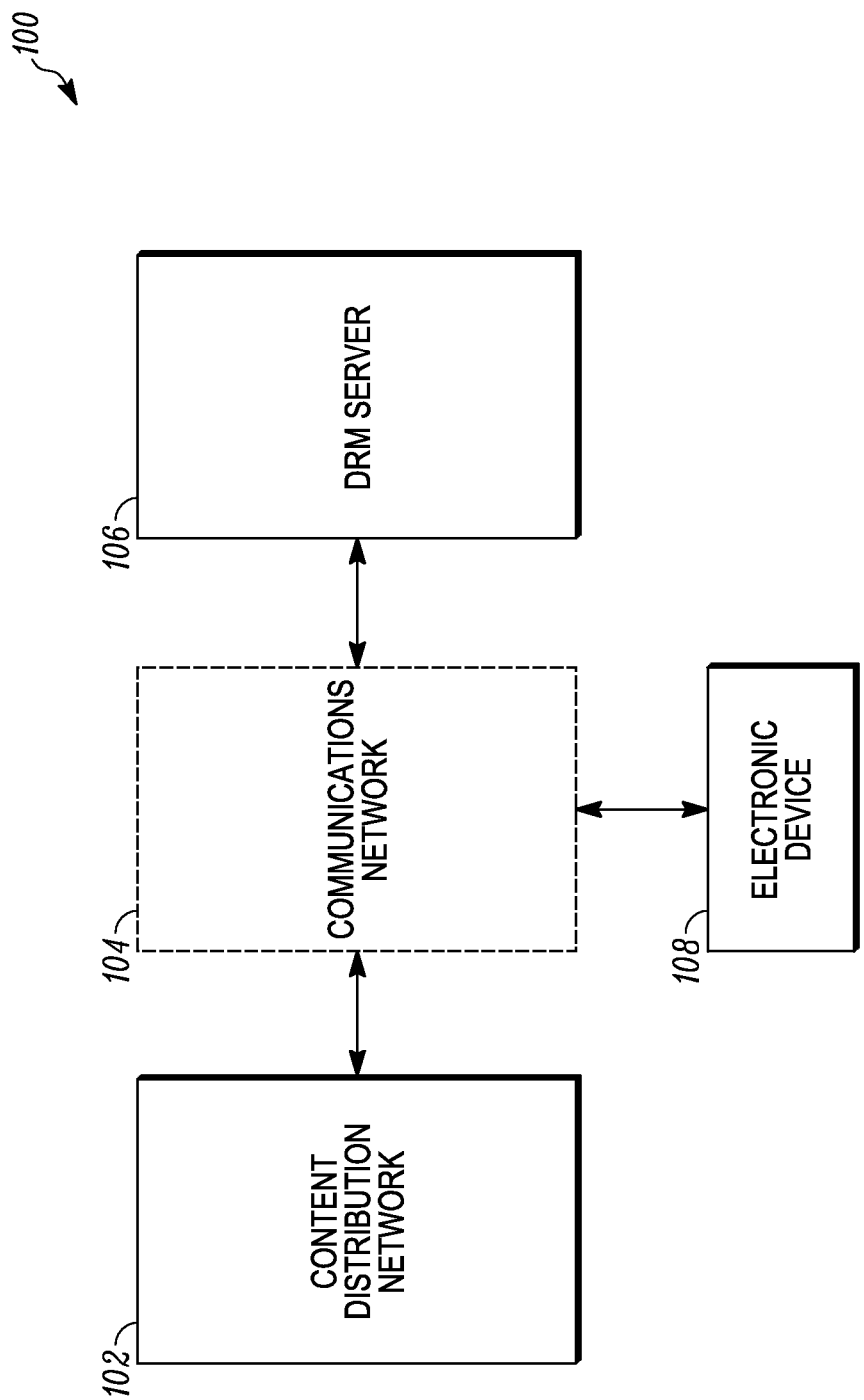
FIG. 1 illustrates a content distribution system configured to implement embodiments of the disclosure.

The examples described are directed to a Digital Rights Management (DRM) system operating in a secure environment within a mobile platform.

Although the present examples are described and illustrated as being implemented in a mobile device system, the system described is provided as an example and not a limitation. Mobile devices may include pocket personal computers (PCs), cellular phones, music players, personal digital assistants (PDAs), tablet devices and the like. These mobile devices are typically configured to operate in a system that includes the internet, PCs and the like to facilitate license and media content transfer.

A typical licensing system is a digital rights management ("DRM") system. As those skilled in the art will appreciate, the present example is suitable for application in a variety of different types of systems that operate under a rights object. The use of a playback period may be useful in the management of licensed content for these types of systems.

In a first aspect, a method of providing digital rights management (DRM) for processing protected content in a mobile platform is disclosed, the method including: providing an application software module configured to implement a non-critical security software module; and providing a critical security module configured to run in a hardware module comprising a trusted execution environment (TEE), wherein the critical security module is configured to provide decryption, key management, key storage and processing, copy and output control enforcement in the TEE; wherein the application software module is in communication with a non-secure memory module and wherein the critical software module is in communication with a secure memory module.

In a second aspect, a method of separating the functionality of a media streaming playback device is disclosed, the method including: providing a non-secure user space; and providing a secure space in communication with the user space, wherein the non-secure user space is configured to process a non-critical portion of client registration and rights acquisition, wherein the non-secure user space comprises a client application and a client providing interface for secure playback, and wherein the secure space is configured to process a critical portion of client registration and rights acquisition, wherein the secure space comprises a secure service that implements critical digital rights management functions, a parser secure service and a secure storage that cannot be accessed by the non-secure user space.

In a third aspect, a mobile device configured to provide digital rights management (DRM) for secure execution of encrypted content is disclosed, the device including: one or more computer processors; and a non-transitory computer-readable storage medium comprising instructions that, when executed, control the one or more computer processors to be configured for: providing an application software module configured to implement a non-critical software module; and providing a hardware module, the hardware module comprising a trusted execution environment (TEE) configured to implement a critical software module, wherein the critical security module is configured to provide decryption, key management, key storage and processing, copy and output control enforcement in the TEE; wherein the application software module is in communication with a non-secure memory module and wherein the hardware module is in communication with a secure memory module.

In a fourth aspect, a mobile device configured to separate the functionality of media streaming playback of encrypted content is disclosed, the device including: one or more computer processors; and a non-transitory computer-readable storage medium comprising instructions that, when executed, control the one or more computer processors to be configured for: providing a non-secure user space; and providing a secure space in communication with the user space, wherein the non-secure user space is configured to process a non-critical portion of client registration and rights acquisition, wherein the non-secure user space comprises a client application and a client providing interface for secure playback, and wherein the secure space is configured to process a critical portion of client registration and rights acquisition, wherein the secure space comprises a secure service that implements critical digital rights management functions, a parser secure service and a secure storage that cannot be accessed by the non-secure user space.

FIG. 1 illustrates a content distribution system 100 configured to implement embodiments of the disclosure. As shown, the content distribution system 100 includes a content distribution network (CDN) 102, a communications network 104, a digital rights management (DRM) server 106 and an electronic device 108.

The communications network 104 includes a plurality of network communications systems, such as routers and switches, configured to facilitate data communication between the CDN 102, the DRM server and the electronic device 108. Persons skilled in the art will recognize that many technically feasible techniques exist for building the communications network 104, including technologies practiced in deploying the well-known internet communications network.

The electronic device 108 may include a computer system, a set top box, a mobile device such as a mobile phone, or any other technically feasible computing platform that has network connectivity and is coupled to or includes a display device and speaker device for presenting video frames, and generating acoustic output, respectively.

The CDN 102 may include one or more computer systems configured to serve download requests or streaming requests for digital content received from the electronic device 108. The digital content may reside as content files on a mass storage system accessible to the computer system or available as live stream from a tuner. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download or stream digital content from the CDN 102 to the electronic device 108. In some embodiments, the digital content is also stored in MP4 (ISO base media file format as defined in ISO 14496-12) file format. Apple HTTP Live Streaming (HLS), Microsoft Smooth Streaming or Adobe dynamic streaming all use HTTP as transfer protocol. MPEG-DASH adaptive streaming also uses HTTP transfer protocol.

The DRM server 106 serves requests for rights objects associated with encrypted digital content files received from the electronic device 108. In operation, an encrypted digital content file downloaded from the CDN 102 by the electronic device 108 must be decrypted before the digital content file can be played. The rights object associated with the encrypted digital content file is stored in the DRM server 106 and is transmitted to the electronic device 108, which in turn uses the rights object to decrypt the digital content file. When the content is streamed live from the server, key material to derive the content key is obtained dynamically from the DRM server.

Rights objects typically regulate the use of content. Most current DRM solutions rely on unique identification of electronic devices, such as mobile devices. In such systems each rights object may be bound to a unique consumer electronics device (or playback device), so the rights object stored in one mobile device typically cannot be transferred or used by another device. The rights object may be provided with information to specify a playback period for the particular media being controlled by that rights object. The rights objects are typically stored separately from the content, typically in a dedicated storage area such as a secure store (e.g., storage space that cannot be accessed by user space).

DRM server 106 typically provides a collection of processes for the secure distribution of multimedia content from a service provider coupled to an insecure channel, such as the Internet. Digital media content for viewing or playback would typically include music files, picture files, video files, documents, etc.

In particular, content may be anything that a provider desires to protect such as music, video, multimedia, pictures and the like. Content is typically regulated to prevent its unauthorized use by providing licenses and/or other tools such as encryption. Content may be audio, video, textual, encrypted, unencrypted, compressed, uncompressed or otherwise manipulated. In some embodiments, content is audio video compressed and encrypted like MPEG-2 TS.

Although, in the above description, the content distribution system 100 is shown with one electronic device 108 and one CDN 102, persons skilled in the art will recognize that the architecture of FIG. 1 contemplates only an exemplary embodiment of the disclosure. Other embodiments may include any number of electronic devices 108 and/or CDNs 102.

Figure 2:
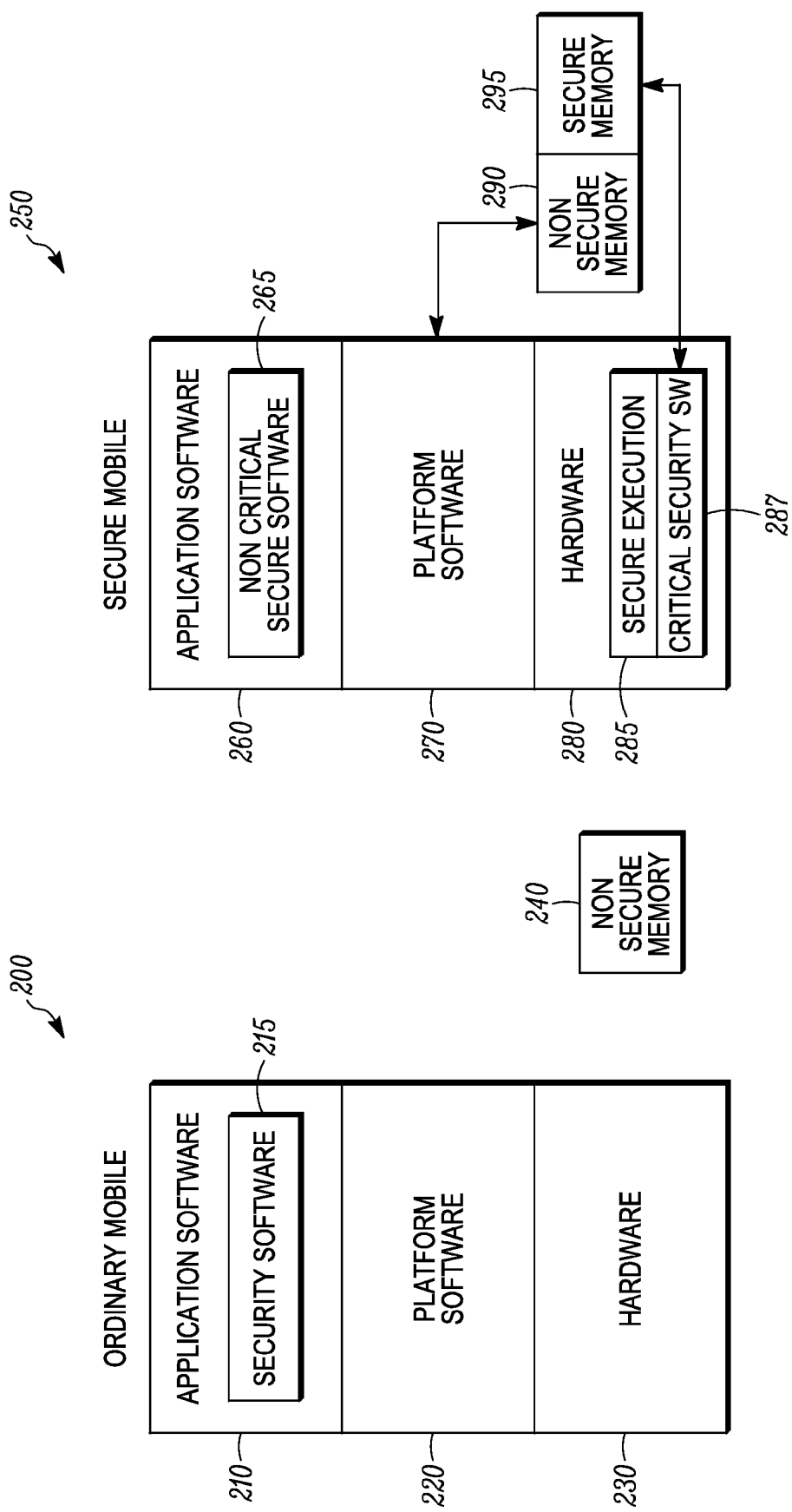
FIGS. 2A and 2B illustrate block diagrams of two examples of mobile platforms configured to implement embodiments of the disclosure.

FIG. 2 illustrates a block diagram of two examples of mobile platforms configured to implement embodiments of the disclosure. In FIG. 2A, a mobile platform 200 may be used for playback of standard definition (SD) content in electronic devices 108. Mobile platform 200 includes application software 210, platform software 220, hardware 230, and non-secure memory 240.

Mobile platform 200 uses software obfuscation, allowing it to protect SD content based on studio requirements. In FIG. 2A, the entire application security component (e.g., security software 215) resides in the application software space 210 and uses non-secure memory 240. The security software 215 is software obfuscated, thus satisfying the SD content playback requirements of content providers. Software obfuscation is well known and tools are provided by vendors such as Irdeto and Arxan. Software obfuscation tools transform the code and data, uses white box technology for cryptographic functions, code integrity verification, and anti-debug protection. Using the tools makes it more difficult for hackers to obtain content keys and access compressed clear data.

In FIG. 2B, a mobile platform 250 may be used for execution of software in secure space and secure memory in electronic devices 108. Mobile platform 250 includes application software 260, platform software 270, hardware 280, non-secure memory 290, and secure memory 295. In FIG. 2B, security software is split into two components. Non-critical software 265 is executed in the application software space 260 and critical security software 287 runs in secure part or secure execution 285 of hardware, also known as a secure or trusted execution environment (TEE). In some embodiments, the critical security software 287 is configured to communicate with and store secure contents in secure memory 295. In some embodiments, non-critical software 265 is configured to communicate with and store non-secure contents in non-secure memory 290. In some embodiments, the secure and non-secure contents are manipulated or processed and stored separately from each other.

Currently software obfuscation tools are used to secure DRM in the playback of SD format content, as described above with reference to FIG. 2A. These tools cannot protect a video path without affecting rendering performance and can be compromised with tools as the code runs in the user space. Studios require a protected video path meaning the video component of the content can never appear in user space memory in compressed form (before being decoded). In addition, the output buffers need to be protected based on HDMI setting. For DRM used for content protection, all the keys and sensitive data need to be handled using hardware security for HD content. Even for studios, approved SD content hardware security is desirable. In order to satisfy the HD robustness rules, a chip that supports Trusted Execution Environment (TEE) (e.g., ARM core chips) is used, such as described above with reference to FIG. 2B. Trusted Execution Environment (TEE) thus provides a protected sandbox or secure space to run sensitive software and also provides firewalls between the various components including the renderer.

Figure 3:
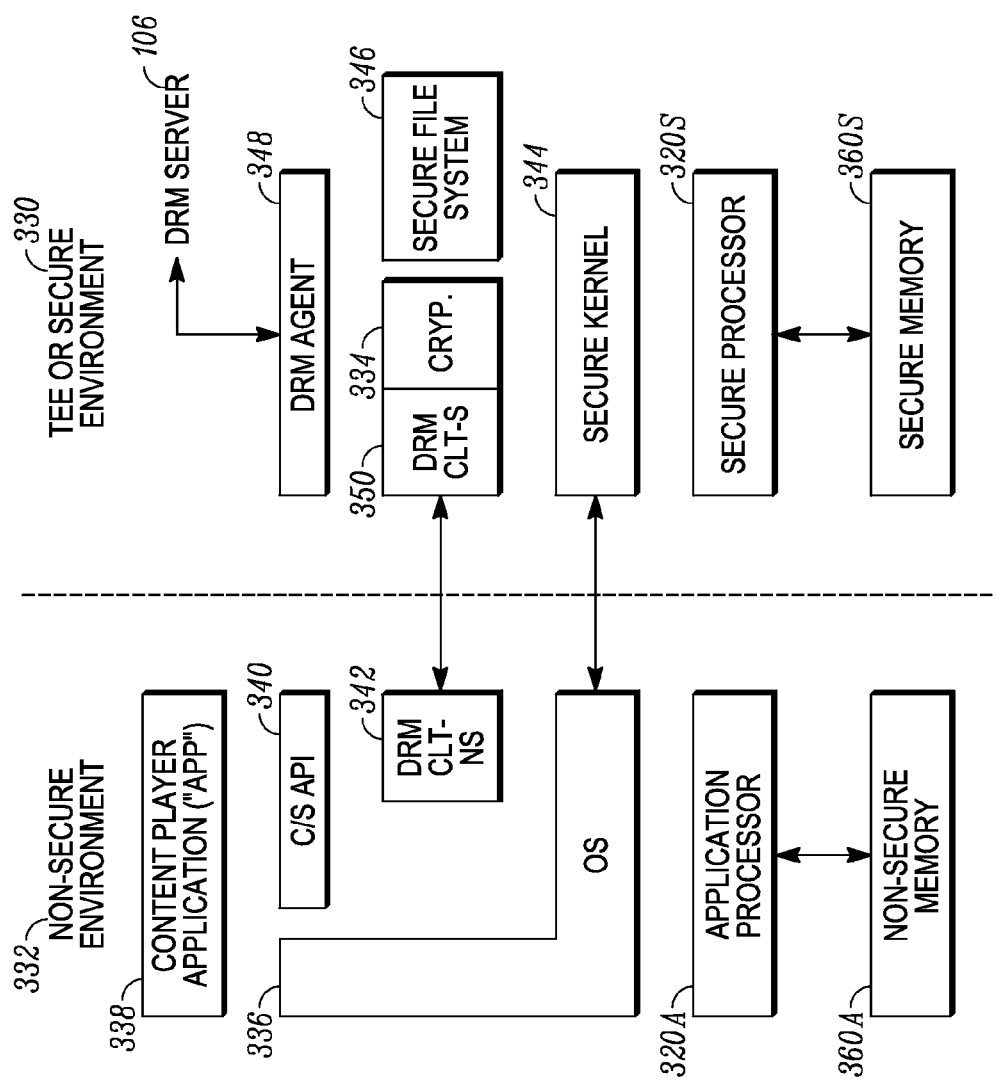
FIG. 3 illustrates a schematic diagram of hardware and software organization of a mobile device according to embodiments of the disclosure.

FIG. 3 illustrates a schematic diagram of hardware and software organization of a mobile device according to embodiments of the disclosure. In FIG. 3, electronic device 108 includes a partitioning of functionality between a secure execution environment 330 and a normal or non-secure environment 332. Hardware components include an application processor 320A in the non-secure environment 332 and a secure processor 320S in the secure environment 330. Also included in the non-secure environment 332 is non-secure memory 360S. Operating software in the non-secure environment includes an operating system (O/S) 336, content player application or "app" 338, chipset application programming interface (C/S API) component 340, and a non-secure (NS) portion of a DRM client (DRM CLT-NS) 342. In some embodiments, the operating system 336 may be an Android™ operating system 336 for mobile devices.

The components in the secure environment 330 are responsible for establishing and maintaining secure communication with DRM server 106 to obtain content key material to derive content keys for decrypting content. Secure environment 330 includes a secure kernel 344, secure file system 346, DRM agent 348, hardware decryption circuit (CRYP) 334, and secure memory 360S. It also includes a secure (S) portion of the DRM client (DRM CLT-S) 350 that may work together with the non-secure DRM client 342 to establish communication with DRM server 106. In the remaining description the term "DRM client" may be used to refer to the paired DRM client portions 342, 350 as a single unit.

The non-secure DRM client 342 is mainly an interface (via the API component 340) between the content player 338 and the secure DRM client 350. In particular, the non-secure DRM client 342 only sends requests to the latter to register electronic device 108, obtain a rights object for a particular media object, and enable decryption and playing of the media object. The DRM Agent 348 is an API layer to access the DRM server 106.

In some embodiments, the secure environment 330 may employ components of the so-called TrustZone family, including the secure processor 320S realized according to the ARM architecture, as well as the secure kernel 344 and secure file system 346 which are specially tailored for security-related uses. Establishing a secure communication channel and execution space may be based on security features offered by the hardware (SOC chipset) that is embedded in a circuit board used to build a device (e.g., mobile phone handset). While the chipset manufacturer provides the hardware, the DRM provider loads firmware (code) such as the DRM client and DRM agent 348.

Figure 4:
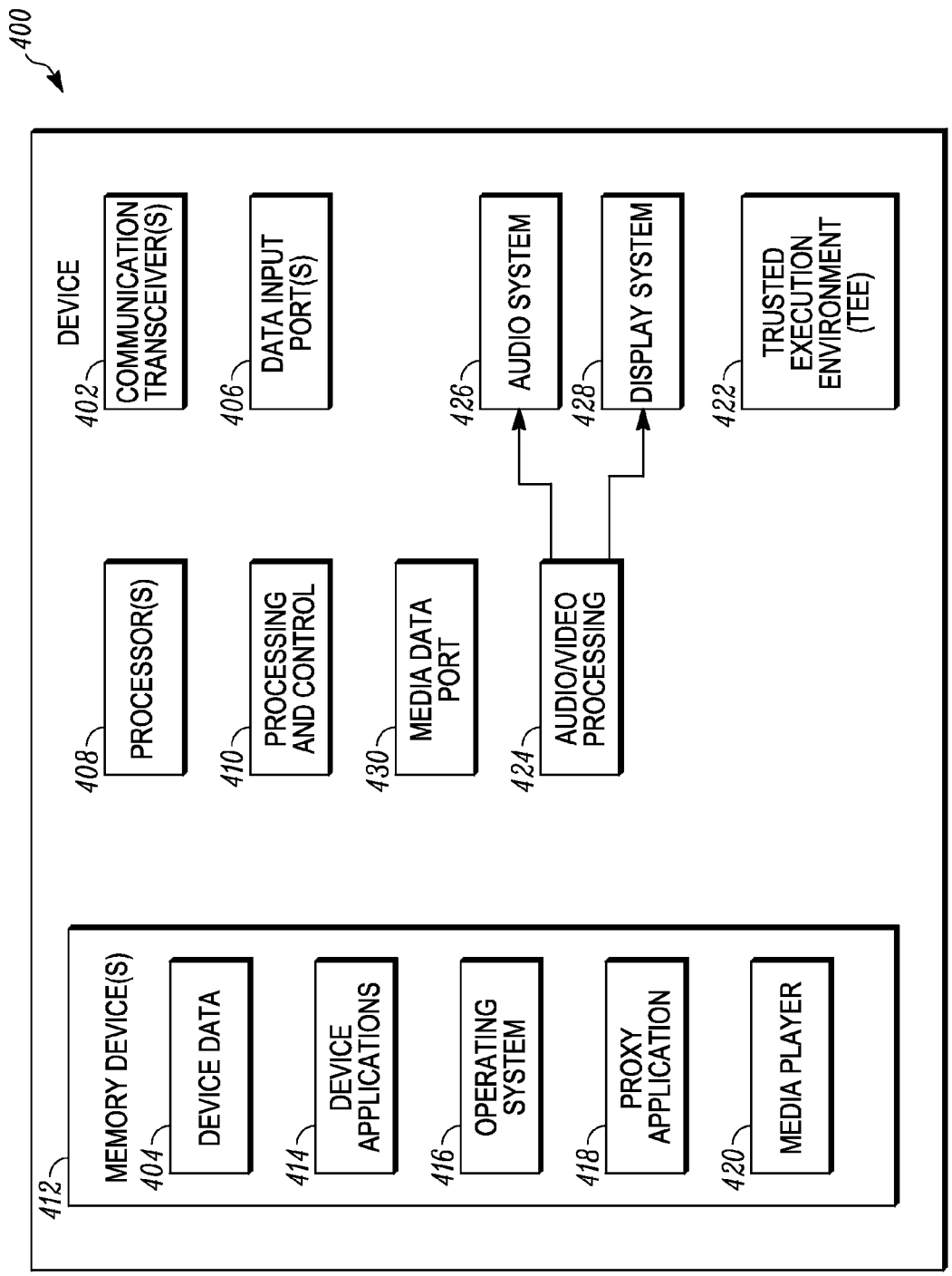
FIG. 4 is a more detailed view of the mobile device of FIGS. 2A, 2B and 3 according to embodiments of the disclosure.

FIG. 4 illustrates various components of an example electronic device 400 that can be implemented as a mobile device described with reference to any of FIGS. 1-3 and 5-9. In some embodiments, the electronic device may be implemented in any form of device that can receive and playback streaming video content, such as anyone or combination of a communication, computer, media playback, gaming, entertainment, mobile phone, and/or tablet computing device.

The electronic device 400 includes communication transceivers 402 that enable wired and/or wireless communication of device data 404, such as received data, data that is being received, data scheduled for broadcast, data packets of the data, etc. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular telephony, wireless metropolitan area network (WMAN) radios compliant with various IEEE 802.15 (WiMAX™) standards, and wired local area network (LAN) Ethernet transceivers.

The electronic device 400 may also include one or more data input ports 406 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the electronic device to components, peripherals, or accessories such as microphones and/or cameras.

The electronic device 400 includes one or more processors 408 (e.g., any of microprocessors, controllers, and the like), which process computer-executable instructions to control operation of the device. Alternatively or in addition, the electronic device can be implemented with any one or combination of software, hardware, firmware, or fixed logic circuitry that is implemented in connection with processing and control circuits, which are generally identified at 410. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 400 also includes one or more memory devices 412 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The electronic device 400 may also include a mass storage media device.

A memory device 412 provides data storage mechanisms to store the device data 404, other types of information and/or data, and various device applications 414 (e.g., software applications). For example, an operating system 416 can be maintained as software instructions within a memory device and executed on the processors 408. The device applications may also include a device manager, such as any form of a control application, software application, signal-processing and control module, code that is native to a particular device, a hardware abstraction layer for a particular device, and so on. The electronic device may also include a proxy application 418 and a media player 420, such as for a client device. The electronic device also includes a trusted execution environment (TEE) 422 that can be implemented in any one or combination of software, hardware, firmware, or the fixed logic circuitry to implement embodiments of content decryption and playback in a secure environment in a mobile platform.

The electronic device 400 also includes an audio and/or video processing system 424 that generates audio data for an audio system 426 and/or generates display data for a display system 428. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 430. In implementations, the audio system and/or the display system are integrated components of the example electronic device.

As will be understood by the flow charts below (FIGS. 6-9), audio and/or video processing system 424 may be partially or wholly included in trusted execution environment 422. In some embodiments, there are a plurality of audio and/or video processing systems 424, with at least one audio and/or video processing system 424 dedicated to processing and rendering data or content in a secure environment and at least one audio and/or video processing system 424 dedicated to processing and rendering data or content in a non-secure environment.

As used herein, content delivery describes the delivery of media "content" such as audio or video or computer software and games over a delivery medium such as broadcasting or the Internet. Content delivery generally has two parts: delivery of finished content for digital distribution, with its accompanying metadata; and delivery of the end product to the end-user.

As used herein, "streaming media" is media that is received by and presented to an end-user while being delivered by a streaming provider using Adaptive Bit Rate streaming among other methods. The name refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using Adaptive Bit Rate among other methods will be referred to as "media" and "streaming."

Adaptive Bit Rate (ABR) streaming is a technology that works by breaking the overall media stream into a sequence of small HTTP-based file downloads, each download loading one short segment of an overall potentially unbounded transport stream. As the stream is played, the client (e.g., the media player) may select from a number of different alternate streams containing the same material encoded at a variety of data rates, allowing the streaming session to adapt to the available data rate. At the start of the streaming session, the player downloads/receives a manifest containing the metadata for the various sub-streams which are available. Since its requests use only standard HTTP transactions, Adaptive Bit Rate streaming is capable of traversing a firewall or proxy server that lets through standard HTTP traffic, unlike UDP-based protocols such as RTP. This also allows a content delivery network (CDN) to readily be implemented for any given stream. ABR streaming methods have been implemented in proprietary formats including HTTP Live Streaming (HLS) by Apple, Inc and HTTP Smooth Streaming by Microsoft, Inc. ABR streaming has been standardized as ISO/IEC 23009-1, Information Technology—Dynamic adaptive streaming over HTTP (DASH): Part 1: Media presentation description and segment formats.

An increasing number of video playback devices, such as the Apple iPad and other mobile devices prefer video content to be delivered via ABR streaming rather than streamed continuously. The iPad, using Apple's HLS format, receives the manifest as an m3u8 file that contains links, media uniform resource identifiers (URIs), to each of the segments or "chunks" of video content, and processes the manifest file to retrieve and play back each media segment in turn. In this disclosure, HLS represents the range of protocols that media segment content and employ a playlist/manifest file to manage playback.

Figure 5:
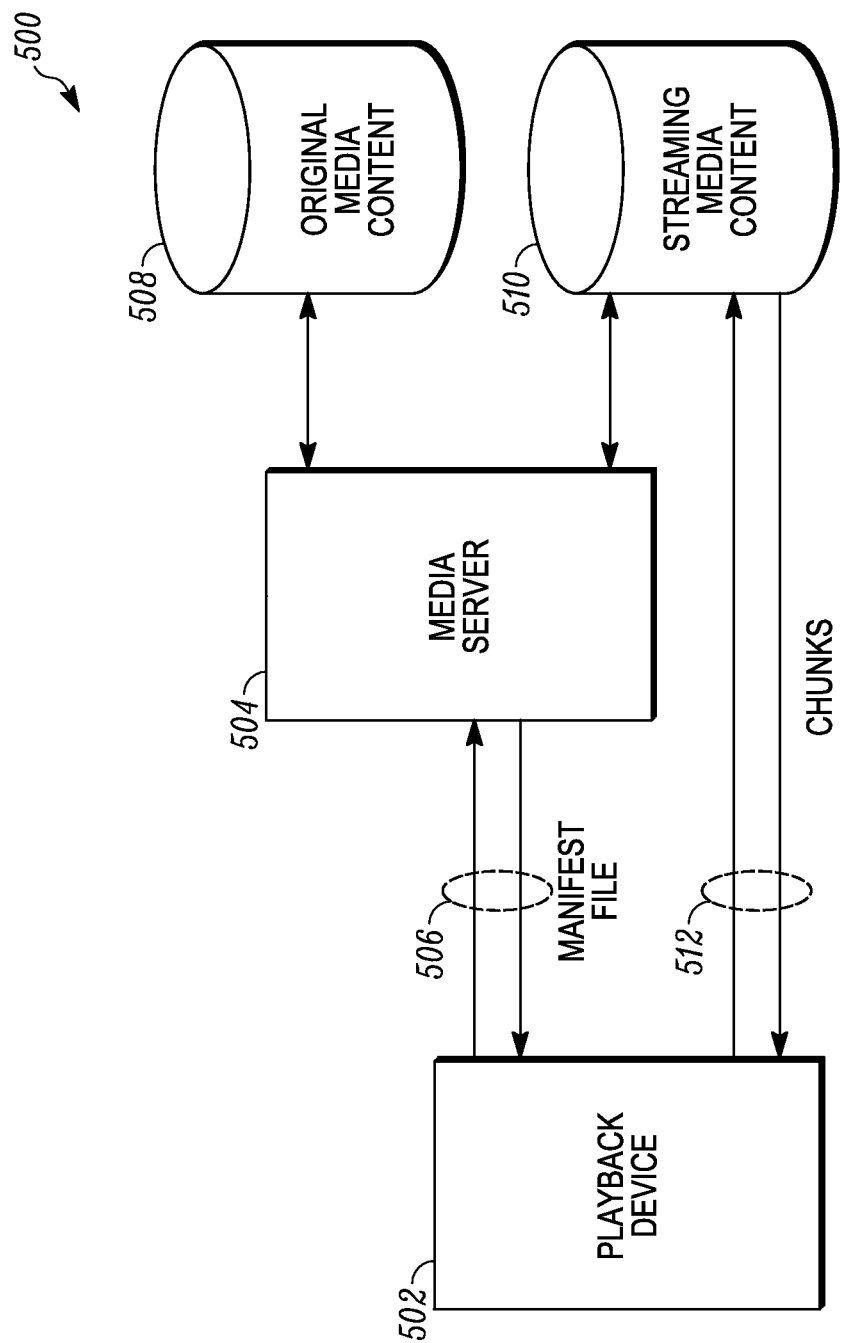
FIG. 5 illustrates an example media streaming system configured to implement embodiments of the disclosure.

Having disclosed some components of a computing system, the disclosure now turns to FIG. 5, which illustrates an example media streaming system embodiment 500. The communications between the entities depicted in FIG. 5 can occur via one or more wired or wireless networks. Further, the devices can communicate directly, via the World Wide Web, or via an application programming interface (API). A playback device 502, such as a mobile electronic device tablet device, first makes a request to a media server 504 for playback of media content, such as an episode of Star Trek. Typically, the media server 504 resides in a network, such as the Internet.

In HLS, the media server 504 receives the request and generates or fetches a manifest file 506 to send to the playback device 502 in response to the request. Example formats for the manifest file 506 include the m3u and m3u8 formats. An m3u8 file is a specific variation of an m3u encoded using UTF-8 Unicode characters. The m3u file format was initially used in the WINAMP Media Player for only audio files, but has since become a de facto playlist standard on many media devices for local and/or streaming media, including music and other media types. Many media devices employ variations of the m3u file format, any of which can be used according to the present disclosure. A manifest file can include links to media files as relative or absolute paths to a location on a local file system, or as a network address, such as a URI path. The m3u8 format is used herein as a non-limiting example to illustrate the principles of manifest files including non-standard variants.

The manifest file 506 includes a list of Uniform Resource Locators (URLs) to different representations of the requested segmented media content. Before or at the time of the request, the media server 504 generates or identifies the media segments of the requested media content as streaming media content 510. The media segments of the streaming media content 510 are generated, either by the media server 504, the content producer, or some other entity, by splitting the original media content 508. Upon receiving the manifest file 506, the playback device 502 can fetch a first media segment for playback from the streaming media content 510, and, during playback of that media segment or chunk 512, fetch a next media segment for playback after the first media segment, and so on until the end of the media content.

In some embodiments, architectural methods are provided which include two main areas: (1) DRM architecture including interface to the player and (2) HLS and MP4 player architecture. In some embodiments, DRM functions include: (1) Registration, (2) Rights Object Acquisition and Verification, (3) Key Management, (4) Content Protection, and (5) Interaction with the player to provide the decrypted encoded data.

As described above, device keys have to be protected using the hardware security (e.g., TEE). Generally a SOC provides a way to secure device keys (e.g., RSA Private Key, Key Encryption Key). These keys can be used only inside the secure space. The SOC while running in secure mode has access to secure RAM and execution memory that cannot be accessed by the user space. The secure space is limited-in case the secure code size is larger than a 500 KB (Kilo Bytes) there may be a code swap during execution, reducing the performance. The entire DRM framework cannot be ported to the secure space.

In some embodiments, an application or user agent uses DRM API, to register, obtain rights acquisition, key acquisition and playback. The API's trigger sends requests to rights acquisition server and/or key management server. This triggers DRM request and DRM reply message transaction between the client and servers. In order to protect the content key all the way from acquisition to generation, parts of the message processing is performed inside the secure space. Rights extraction, parsing, and verification functions are all performed inside the secure service. After verification of the rights, the content key is derived and decryption engine is set inside the secure space. The user space has only access to the session of the transaction, content ID or URL for playback. The DRM also provides the decrypt interface API's inside the secure space as the video path has to be protected.

In some embodiments, in order to satisfy protected video path requirement, an HLS player is also split into two parts. The front end or the user part of the player that communicates with the network to download the HLS Manifest and chunks provides player API for the application and plays the content. The secure part of the player includes a HLS TS parser, demultiplexer and manages secure buffer handles (buffers for decoding the video). The SOC provides handles in the user space which is translated to appropriate address in the secure space for decrypted decoded/encoded video. Even though in some embodiment we discuss Apple's HLS streaming, same method applies to MPEG-DASH transport based version (MPEG-2) and DLNA/DTCP-IP based streaming regarding secure part of the player.

In some embodiments, the HLS player passes the encrypted TS chunk to the TEE as standard HLS encrypts the whole TS, and triggers DRM Decrypt based on the session ID inside the secure space. DRM at this stage has the content key set in the engine. The decrypted data is demultiplexed into audio, video and closed caption text. Audio and closed caption text data is pulled by the user space player using non-secure buffers. An HLS Video Push API passes the secure buffer handle, encrypted data to the TEE. Inside the secure space after translation the secure buffer is populated with decrypted encoded video. Since the secure buffer is fire wall protected, an Openmax API call to decode will use secure buffer maintaining protection of the video back into the userspace. Openmax API is the Khronos Open Source API implemented by the decoder vendors to decode encoded stream. This is available in the Android System used in the present example.

In the case of an MP4 file format, metadata is in the clear, so demultiplexing is not done inside the secure space. For example, unlike HLS, in MP4 only an mdat box or content data is encrypted. Metadata defines the properties of the video, audio and data tracks in the file. The properties include size, resolution, presentation time stamp, protection type used, etc. This applies to MPEG-DASH, MPEG-4 file format, fragmented MP4 files, Microsoft smooth streaming, etc.

For HLS and/or MP4, video data after decryption go into secure buffers and are pulled by user space API to decode and render. Audio packets after decryption are passed to user space buffers. In order to ensure that the decrypted audio packets are really audio packets, the decrypted audio buffer is scanned for audio specific data. This is done to ensure that the user space code is not compromised and video data is not presented as audio data in order to bypass the protected video path.

In some embodiments, the same mechanism may be used in case MPEG-2 TS headers are in the clear, and only the payload is encrypted for HTTP live streaming. In addition, the interface API's between the player and the DRM, should to handle high definition multimedia interface (HDMI) output correctly. Based on DRM copy protection rules and high bandwidth digital content protection (HDCP) is enabled or disabled, output uncompressed video buffer can be mirrored to HDMI port or not and this is set as oplv (Output Protection Flag) flag in SetKey API to notify the user in case HDMI cable is connected but HDCP is not enabled. The DRM Decrypt function inside the TEE checks if HDMI Mirroring can be allowed, e.g., meaning HDCP is active, and will allow playback only for 10 seconds and will throw error if HDCP is not active. The user can take action to enable HDCP using the user interface.

Figure 6:
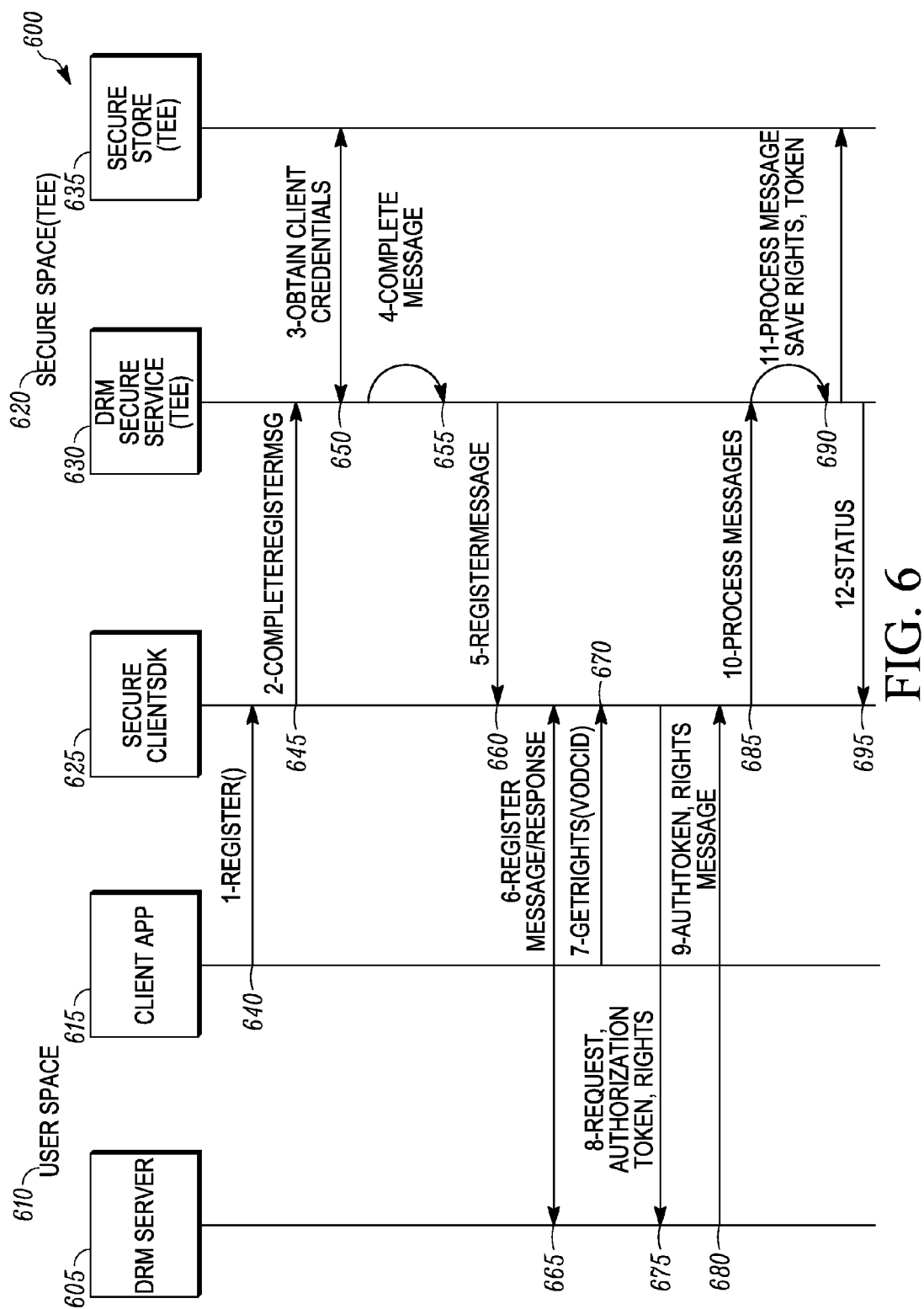
FIG. 6 is a flow diagram of method steps for client registration and rights acquisition in a secure environment according to embodiments of the disclosure.

FIG. 6 is a flow diagram of a process 600 for client registration and rights acquisition in a secure environment according to embodiments of the disclosure. Process 600 may be implemented by a user space environment 610 and a secure space (TEE) 620. User space environment 610 includes DRM Server 605, Client Application 615 and SecureClient SDK 625. Secure space (TEE) 620 includes DRMSecureService (TEE) 630 and SecureStore (TEE) 635. In order to satisfy robustness, parts of DRM message requests and responses are processed inside the secure space (TEE) 620. In some embodiments, Secure Client SDK (Software Development Kit) 625 provides API for Secure playback of both the MPEG-2 transport and MPEG_4 containers. DRMSecureService 630 implements security critical functions inside the secure space, for example, rights verification.

In a first step 640, a client (e.g., via Client Application 615) executes a register command (e.g., via SecureClient SDK 625). Secure Client Software Development Kit (SDK) 625 is provided for service providers and one of the API's is to register the client to the DRM server and it runs in the user space and is part of the application.

In a second step 645, third step 650, and fourth step 655, the register request message is completed and signed using the client's credentials (e.g., client's private key). As shown, in second step 645, SecureClient SDK 625 communicates with DRMSecureService (TEE) 630 to complete the register message. In third step 650, DRMSecureService (TEE) 630 communicates with SecureStore (TEE) 635 to obtain client credentials. In fourth step 655, the message is completed.

In a fifth step 660 and sixth step 665, the request is sent to the DRM Server 605 and registration completed. In fifth step 660, DRMSecureService (TEE) 630 communicates with SecureClient SDK 625 to register the request message. In sixth step 665, SecureClient SDK 625 communicates with DRM Server 605 to register the request message and receive a response back.

In a seventh step 670 and eighth step 675, the client triggers a rights object request for content and the request is sent to the server. In seventh step 670, Client Application 615 communicates with SecureClient SDK 625 to get rights for content with content ID (CID). In eighth step 675, SecureClient SDK 625 communicates with DRM Server 605 to request an authorization token and rights.

In a ninth step 680, the server sends the authentication token and the rights message. In ninth step 680, DRM Server 605 communicates with SecureClient SDK 625 to send the authentication information.

In a tenth step 685, eleventh step 690 and twelfth step 695, the client processes the response inside secure space, extracts the rights and saves in the secure memory. In tenth step 685, SecureClient SDK 625 communicates with DRMSecureService (TEE) 630 to process the message. In eleventh step 690, DRMSecureService (TEE) 630 communicates with SecureStore (TEE) 635 to process the message, save rights and the token. In twelfth step 695, DRMSecureService (TEE) 630 communicates with SecureClient SDK 625 to provide the status.

Figure 7:
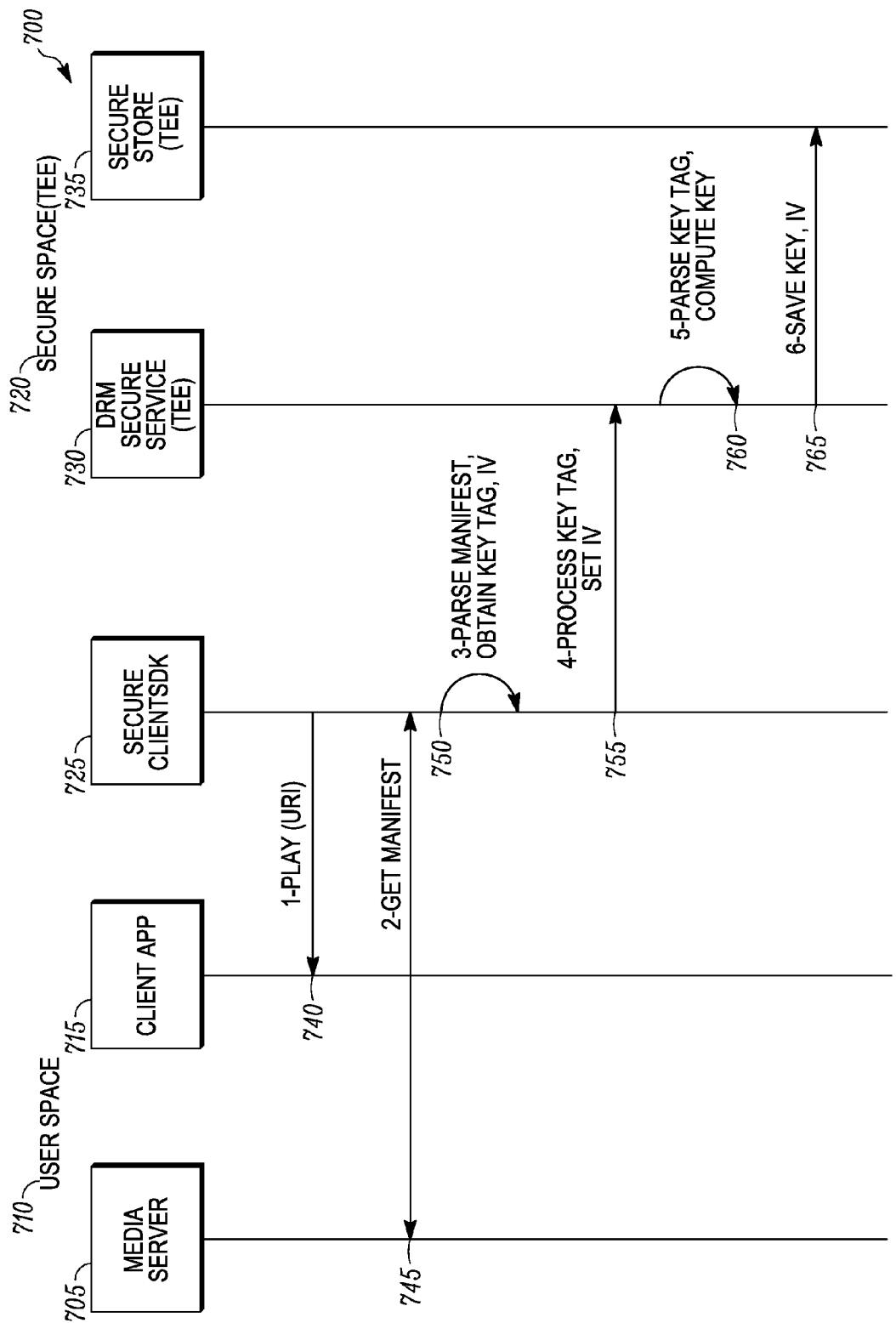
FIG. 7 is a flow diagram of method steps for initializing a content key in a secure environment for HTTP Live Streaming (HLS) according to embodiments of the disclosure.

FIG. 7 is a flow diagram of a process 700 for initializing a content key in a secure environment for HTTP Live Streaming (HLS) according to embodiments of the disclosure. User space environment 710 includes Media Server 705, Client Application 715 and SecureClient SDK 725. Secure space (TEE) 720 includes DRMSecureService (TEE) 730 and SecureStore (TEE) 735. Process 700 shows content key acquisition for an example HTTP Live Streaming (HLS) use case.

In a first step 740, a client executes a play command for a particular HLS URI. In first step 740, Client Application 715 communicates with SecureClient SDK 725 to play the URI.

In a second step 745 and a third step 750, a security client (e.g., SecureClient SDK 725) requests a manifest file and extracts the key URI. In second step 745, SecureClient SDK 725 communicates with Media Server 705 to get the manifest file. In third step 750, SecureClient SDK 725 module parses the manifest file and obtains the key tag and initial vector (IV). The key tag in HLS manifest provides the URI or information to obtain the key and IV to decrypt the content.

In a fourth step 755 and fifth step 760, the key URI is processed inside secure space and a content key is computed. In fourth step 755, SecureClient SDK 725 communicates with DRMSecureService (TEE) 730 to process the key tag and set IV. In fifth step 760, DRMSecureService (TEE) 730 parses the key tag and computes the key. The key tag in HLS manifest provides the URI or information to obtain the key and initial vector or IV to decrypt the content. The content key is computed inside the secure space.

In a sixth step 765, the content key and IV are saved in the secure memory. In sixth step 765, DRMSecureService (TEE) 730 is in communication with SecureStore (TMM) or TEE 735 to save the key, IV.

Figure 8:
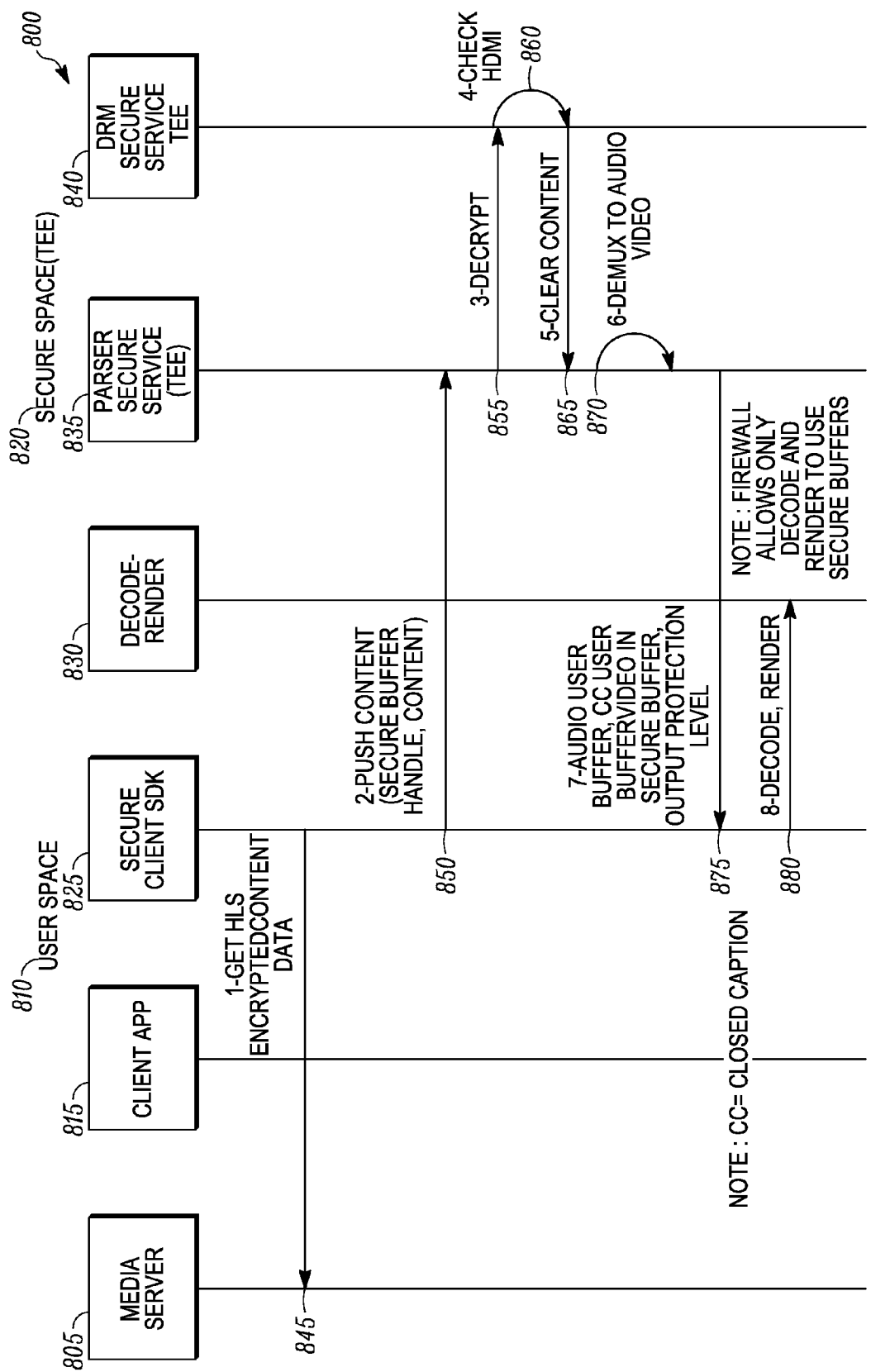
FIG. 8 is a flow diagram of method steps for playback of HLS content according to embodiments of the disclosure.

FIG. 8 is a flow diagram of a process 800 for playback of HLS content according to embodiments of the disclosure. User space environment 810 includes Media Server 805, Client Application 815, SecureClient SDK 825, and DecodeRender 830. Secure space (TEE) 820 includes Parser SecureService (TEE) 835 and DRM SecureService TEE 840. In process 800, the HLS format is an MPEG-2 transport stream, and the entire transport stream is encrypted. The sequence for rendering HD HLS content is as follows. It should be appreciated that the device is registered and authenticated and the content key is set as described in FIGS. 6 and 7.

In a first step 845, SecureClient SDK 825 obtains HLS content data from Media Server 805. Media Server 805 is responsible for generating the HLS manifests and media chunks and providing them to the client on request. Media Server 805 interfaces with the DRM server to encrypt the HLS chunks before transmitting to the client.

In a second step 850 and third step 855, SecureClient SDK 825 pushes encrypted data to Parser SecureService (TEE) 835 and provides a secure buffer handle (e.g., DRM SecureService TEE 840). The secure buffer handle can be a virtual or abstract handle that can be referenced or created in user application space without root privileges, allowing a single function that resides in both secure and non-secure application space to use the secure buffer handle's virtual or abstract handle. If the handles are physical addresses, then the function residing in application user space may not have any read access. Parser Secure Service 835 is configured to parse or demultiplex the HLS MPEG-2 packets into video, audio and closed caption data after decryption. Video data is copied only to secure memory. The secure buffer handle from user application space is translated to firewall memory inside the secure space. This memory is configured to be read only by decoder component within the secure service. In some embodiments, the decoder component is OpenMAX IL decoder component and uses a non-tunnel way of communication. DRM Secure Service 840 is configured to generate/process DRM messages, generate content keys, provide decrypted interfaces to Parser Secure Service 835 and enforce copy protection rules. In second step 850, SecureClient SDK 825 communicates with Parser SecureService (TEE) 835 to push content. In third step 855, Parser SecureService (TEE) 835 communicates with DRM SecureService TEE 840 to decrypt the content.

In a third step 855, a secure parser service (e.g., Parser SecureService (TEE) 835) inside the TEE invokes a secure DRM service (e.g., DRM SecureService TEE 840) to decrypt the content chunks.

In a fourth step 860, DRM SecureService TEE 840 checks for if HDMI is enabled and required based on copy control bits (CCI) and then decrypts the content and returns it to the secure parser service (e.g., Parser SecureService (TEE) 835) in a step 865.

In a sixth step 870, the secure parser service demultiplexes the clear transport stream into video, audio and closed caption streams. In a seventh step 875, the audio and closed caption streams are returned in normal buffer. Video remains in secure buffer provided by the secure buffer handle. The User Space client (e.g., Client Application 815 and SecureClient SDK 825) cannot see the clear encoded video.

In an eighth step 880, SecureClient SDK 825 communicates with Decode Render 830 to decode the video and render to a liquid crystal display (LCD). Decode Render 830 (e.g., Open max IL/ALAPI is used in the example Android System) can read the secure buffer protected by a firewall (not shown). The firewall prevents any other user application from accessing the secure video buffers. The firewall configuration is set during secure boot of the device. This allows the platform Decoder Render 830 to read the Secure buffer, decode and render the video. Audio and closed caption data are in user space buffers and rendered also.

Figure 9:
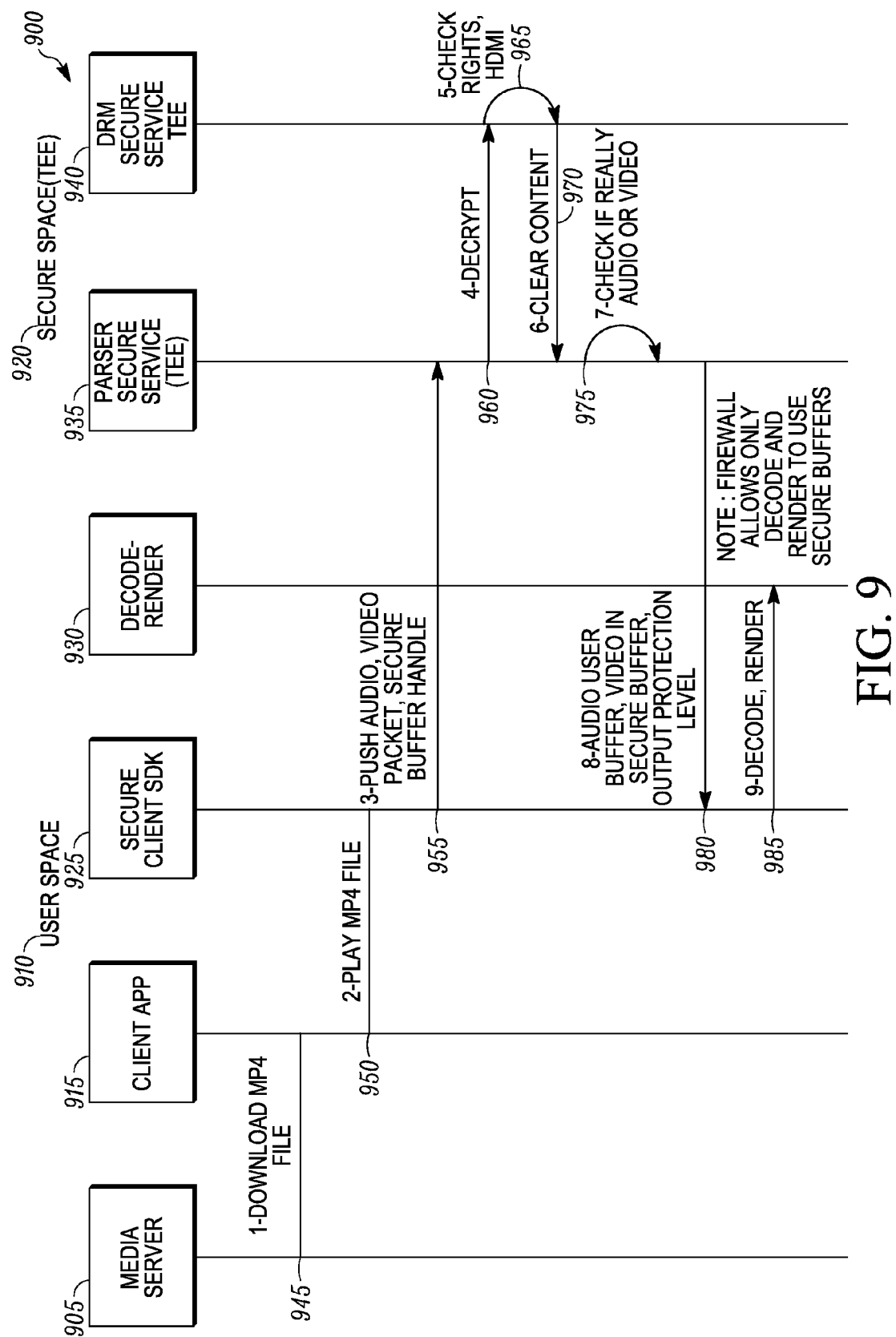
FIG. 9 is a flow diagram of method steps for playback of an MP4 file according to embodiments of the disclosure.

FIG. 9 is a flow diagram of a process 900 for playback of an MP4 file according to embodiments of the disclosure. User space environment 910 includes Media Server 905, Client Application 915, SecureClient SDK 925, and Decode-Render 930. Secure space (TEE) 920 includes Parser SecureService (TEE) 935 and DRM SecureService TEE 940. MP4 playback may be used for a file download or sync and go use case.

In a first step 945, Client Application 915 downloads a content file from Media Server 905.

In a second step 950, SecureClient SDK 925 executes a play command after receiving the content file from Client Application 915.

In a third step 955, because MP4 metadata is in clear, encrypted video and audio buffers are pushed into secure space. In third step 955, SecureClient SDK 925 pushes video and audio packets into Parser SecureService (TEE) 935. As described above, metadata refers to video, audio description, size and location in the file. Since this information is in the clear (e.g., not encrypted), parsing need not be done in secure space.

In a fourth step 960, MP4 parser class requests DRM Service decrypt function. In fourth step 960, Parser SecureService (TEE) 935 communicates with DRM SecureService TEE 940.

In a fifth step 965, the DRM Service verifies rights, checks if HDMI is enabled and then decrypts the content.

In a sixth step 970, the DRM SecureService TEE 940 communicates with Parser SecureService (TEE) 935 to provide the decrypted (clear) content.

In a seventh step 975 and eighth step 980, the parser checks if audio buffer is really audio (and not video) and sends the audio to user space in the clear. When the parser checks the audio buffer, it is done to ensure that only audio data is sent to unsecure memory, and that video data does not get mislabeled and sent to unsecure memory. In eighth step 980, Parser SecureService (TEE) 935 communicates with SecureClient SDK 925 to send the audio content to the user space. The video clear compressed data will be in secure buffer and user space will only have to handle the video secure buffer.

In a ninth step 985, SecureClient SDK 925 communicates with Decode Render 930 to render the content. Decode Render 930 has access to secure buffer. In some embodiments, Openmax IL/ALAPI is used as in HLS case to decode and render.

As explained above, DRM architecture for TEE enables protection for all the permanent keys by using device hardware keys. Rights object creation, process and verification is performed in TEE, so user entitlement is not compromised. Additionally, sensitive functions of DRM, like message signing, decryption using RSA private key is handled inside the secure space. All key wrappings, unwrapping code is executed inside the secure service. Functions like content key derivation, session key derivation execution happens inside TEE, so are also secure. Even though session keys or intermediate wrapping keys are not permanent, their exposure can lead to eventual exposure of a content key.

In the case of an HLS Player, TS parser is implemented inside the TEE, so the demultiplexing of video and audio packets occurs inside the secure space. The decrypted encoded video uses secure buffers. This way the decrypted decoded video packets are not accessible by user space memory bus. A decoder (e.g., accessed using Open MAX API) is programmed to use secure buffers and also the output buffers can also be fire wall protected.

DTCP-IP (DLNA) protected content streaming inside a home network can be treated in the same manner as HLS as the entire MPEG 2-TS stream is encrypted using DTCP-IP. DTCP-IP adds header in front of the payload. Header contains information to derive keys.

In the case of MP4 file format, the video and audio tracks are encrypted but already demultiplexed inside the file. Video data is decrypted inside the secure space and copied to secure buffers and User space will only have handle to the secure buffer. Open MAX decoder uses the protected memory and will get the handle to secure buffer that contains the decrypted encoded video.

An HLS TS parser and MP4 player component inside the secure space initiates DRM decrypt function inside the secure space, thus preventing any attacks to decrypt interface. HDMI output protection is also enforced inside secure service as Decrypt functions checks if HDCP is required and if required, then checks if enabled. If HDCP is not enabled when required the decryption will fail after 10 seconds.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method of providing digital rights management (DRM) for processing protected content in a mobile platform, the method comprising:
   providing an application software module configured to implement a non-critical security software module; and
   providing a critical security module configured to run in a hardware module comprising a trusted execution environment (TEE), wherein the critical security module is configured to receive content data and to provide decryption, key management, key storage and processing, and copy and output control enforcement in the TEE, wherein the TEE is configured to separate the content data into video data, audio data, and textual data, to provide a secure buffer handle to provide a secure buffer to store the video data, and to transfer the audio data and the textual data to the application software module, the secure buffer protected by a firewall configured to prevent a user application other than a render application from accessing the secure buffer;

wherein the application software module is in communication with a non-secure memory module and wherein the critical security module is in communication with a secure memory module.

2. The method of claim 1, wherein one or more handles or pointers shared with the application software module are used to control demultiplexed, decrypted content data in the secure memory module.

3. The method of claim 2, wherein the critical security module is configured to receive the content data and rights objects associated with content files.

4. The method of claim 3, wherein the critical security module is configured to receive the content data and the rights objects from a local SD card memory.

5. The method of claim 3, wherein the content data comprises encrypted, compressed audio and video data and optionally encrypted textual data.

6. The method of claim 5, wherein the content data is transferred to the TEE and the content data is decrypted.

7. The method of claim 5, wherein the encrypted content data comprises HTTP Live Streaming (HLS) data, DLNA/DTCP-IP data, or MPEG-DASH transport based (MPEG-2) data.

8. The method of claim 1, wherein the video data is stored in the secure memory module.

9. The method of claim 1, wherein the application software module cannot read the secure memory module and secure DRM data.

10. A method of providing digital rights management (DRM) for processing protected content in a mobile platform, the method comprising:
providing an application software module configured to implement a non-critical security software module; and
providing a critical security module configured to run in a hardware module comprising a trusted execution environment (TEE), wherein the critical security module is configured to receive content data and to provide decryption, key management, key storage and processing, and copy and output control enforcement in the TEE, wherein the TEE is configured to receive the content data and rights objects associated with content files, the content files comprise separated encrypted, compressed audio and video data, the TEE is configured to provide a secure buffer to store the video data, the secure buffer protected by a firewall configured to prevent a user application other than a render application from accessing the secure buffer;
wherein the application software module is in communication with a non-secure memory module and wherein the critical security module is in communication with a secure memory module.

11. The method of claim 10, wherein the content data is transferred to the TEE and decrypted.

12. The method of claim 11, wherein the decrypted content audio data is parsed to verify that it is audio data.

13. The method of claim 11, wherein the video data is stored in the secure memory module.

14. The method of claim 10, wherein the encrypted content data comprises MPEG-DASH ISO base media data, MP4 data, or Microsoft smooth streaming data.

15. A method of separating the functionality of a media streaming playback device, the method comprising:
providing a non-secure user space in the media streaming playback device; and
providing a secure space, in the media streaming playback device, in communication with the non-secure user space,
wherein the non-secure user space is configured to process a non-critical portion of client registration and rights acquisition, wherein the non-secure user space comprises a client application and a client providing interface for secure playback,
wherein the secure space is configured to process a critical portion of the client registration and the rights acquisition, wherein the secure space comprises a secure service that implements critical digital rights management functions, a parser secure service and a secure storage protected by a firewall configured to prevent a user application other than a render application from accessing the secure storage, and
wherein signals for the client registration flow from the non-secure user space to the secure space to the non-secure user space.

16. The method of claim 15, wherein the non-critical portion of the client registration and the rights acquisition comprises providing a register request and requesting an authorization token and rights message.

17. The method of claim 15, wherein the critical portion of the client registration and the rights acquisition comprises obtaining client credentials, processing a rights message to extract rights information, and saving the extracted rights information.

18. The method of claim 15, wherein the media streaming playback device is an HTTP Live Streaming (HLS) device, DLNA/DTCP-IP device, or MPEG-DASH transport based (MPEG-2) device.

19. The method of claim 18, further comprising:
wherein the non-secure user space is configured to process a non-critical portion of deriving a content key and wherein the secure space is configured to process a critical portion of the deriving the content key.

20. The method of claim 19, wherein the non-critical portion of the deriving the content key comprises providing a play request, obtaining a manifest file, parsing the manifest file and obtaining a key tag.

21. The method of claim 20, wherein the critical portion of the deriving the content key comprises, taking as input the key tag, computing the content key, and saving the content key.

22. The method of claim 19, further comprising:
wherein the non-secure user space is configured to process a non-critical portion of playback of content and wherein the secure space is configured to process a critical portion of the playback of content.

23. The method of claim 22, wherein the non-critical portion of the playback of content comprises obtaining content data.

24. The method of claim 22, wherein the critical portion of the playback of content comprises decrypting content, demultiplexing a transport stream into video, audio and closed caption streams, and enforcing output protection.

25. The method of claim 15, wherein the media streaming playback device is a MPEG-DASH ISO base media device, an MP4 device, or Microsoft smooth streaming device.

26. The method of claim 25, further comprising:
wherein the non-secure user space is configured to process a non-critical portion of playback of content and wherein the secure space is configured to process a critical portion of the playback of content.

27. The method of claim 26, wherein the non-critical portion of the playback of content comprises downloading an MP4 file, providing a play request for the MP4 file, and demultiplexing the MP4 file.

28. The method of claim 26, wherein the critical portion of the playback of content comprises decrypting content, verifying user rights, verifying if an audio buffer includes audio data, and enforcing output protection.

29. A mobile device configured to provide digital rights management (DRM) for secure execution of encrypted content, the device comprising:
one or more computer processors; and
a non-transitory computer-readable storage medium comprising instructions that, when executed, control the one or more computer processors to be configured for:
providing an application software module configured to implement a non-critical security software module; and
providing a hardware module, the hardware module comprising a trusted execution environment (TEE) configured to implement a critical software module, wherein the critical software module is configured to receive content data and to provide decryption, key management, key storage and processing, and copy and output control enforcement in the TEE, wherein the TEE is configured to separate the content data into video data, audio data, and textual data, to provide a secure buffer handle to provide a secure buffer to store the video data, and to transfer the audio data and the textual data to the application software module, the secure buffer protected by a firewall configured to prevent a user application other than a render application from accessing the secure buffer;
wherein the application software module is in communication with a non-secure memory module and wherein the hardware module is in communication with a secure memory module.

30. A mobile device configured to separate the functionality of media streaming playback of encrypted content, the device comprising:
one or more computer processors; and
a non-transitory computer-readable storage medium comprising instructions that, when executed, control the one or more computer processors to be configured for:
providing a non-secure user space in the mobile device; and
providing a secure space, in the mobile device, in communication with the non-secure user space,
wherein the non-secure user space is configured to process a non-critical portion of client registration and rights acquisition, wherein the non-secure user space comprises a client application and a client providing interface for secure playback,
wherein the secure space is configured to process a critical portion of the client registration and the rights acquisition, wherein the secure space comprises a secure service that implements critical digital rights management functions, a parser secure service and a secure storage protected by a firewall configured to prevent a user application other than a render application from accessing the secure storage, and
wherein signals for the client registration flow from the non-secure user space to the secure space to the non-secure user space.

31. A mobile device configured to provide digital rights management (DRM) for secure execution of encrypted content, the device comprising:
one or more computer processors; and
a non-transitory computer-readable storage medium comprising instructions that, when executed, control the one or more computer processors to be configured for:
providing an application software module configured to implement a non-critical security software module; and
providing a hardware module, the hardware module comprising a trusted execution environment (TEE) configured to implement a critical software module, wherein the critical software module is configured to receive content data and to provide decryption, key management, key storage and processing, and copy and output control enforcement in the TEE, wherein the TEE is configured to receive the content data and rights objects associated with content files, the content files comprise separated encrypted, compressed audio and video data, the TEE is configured to provide a secure buffer to store the video data, the secure buffer protected by a firewall configured to prevent a user application other than a render application from accessing the secure buffer;
wherein the application software module is in communication with a non-secure memory module and wherein the hardware module is in communication with a secure memory module.

* * * * *